United States Patent Office 3,285,730
Patented Nov. 15, 1966

3,285,730
METHOD FOR CONTROLLING PLANT GROWTH
Konrad Weis, Willi Hahn, and Ludwig Eue, Cologne-Stammheim, Germany, assignors to Farbenfabriken Bayer Aktiengesellschaft, Leverkusen, Germany, a German corporation
No Drawing. Filed Mar. 11, 1963, Ser. No. 264,067
Claims priority, application Germany, Mar. 15, 1962,
F 36,281
9 Claims. (Cl. 71—2.3)

It has been found that aromatic amines containing thiocyano groups of the formula

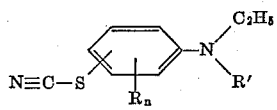

in which:

R stands for hydrogen, alkyl, halogen, nitro, hydroxy, alkoxy, alkylmercapto, carboxyl and ester groups,
$n$ stands for a whole number from 1 to 2 and
R' stands for hydrogen, alkyl, optionally substituted aryl and the radicals —CO—R", —CO—OR''' and

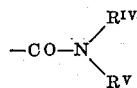

wherein:

R" and R''' stand for alkyl, chloroalkyl and optionally substituted aryl and
$R^{IV}$ and $R^V$ stand for hydrogen and alkyl possess a distinct herbicidal activity and are therefore very suitable as weed control and defoliating agents as well as general agents for influencing plant growth. In the above formula of the compounds according to the invention R stands preferably for hydrogen, alkyl radicals with 1 to 4 carbon atoms, chlorine, bromine, nitro, hydroxyl, alkoxy with 1 to 4 carbon atoms, alkyl mercapto with 1 to 4 carbon atoms and the carboxyl group. R' preferably stands for hydrogen, alkyl with 1 to 4 carbon atoms, phenyl, thiocyano phenyl and the radicals —CO—R", —CO—OR''' and

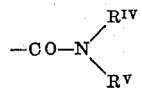

wherein R" and R''' stand for alkyl radicals with 1 to 4 carbon atoms, chloroalkyl radicals with 1 to 4 carbon atoms and the phenyl radical and wherein $R^{IV}$ and $R^V$ stand for hydrogen and alkyl radicals with 1 to 4 carbon atoms.

The following compounds may be mentioned as some examples of active representatives of this class of substances.

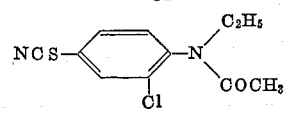

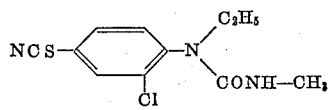

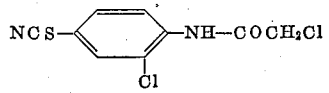

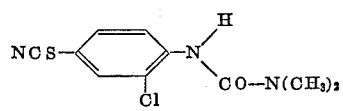

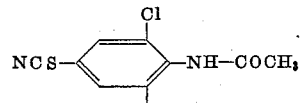

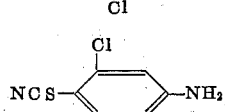

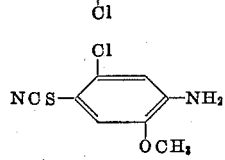

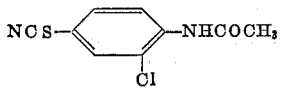

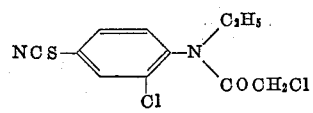

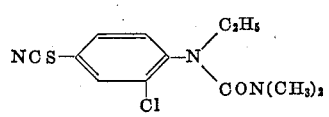

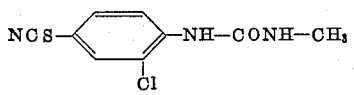

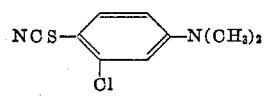

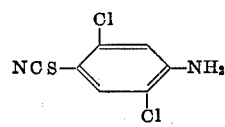

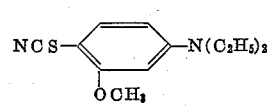

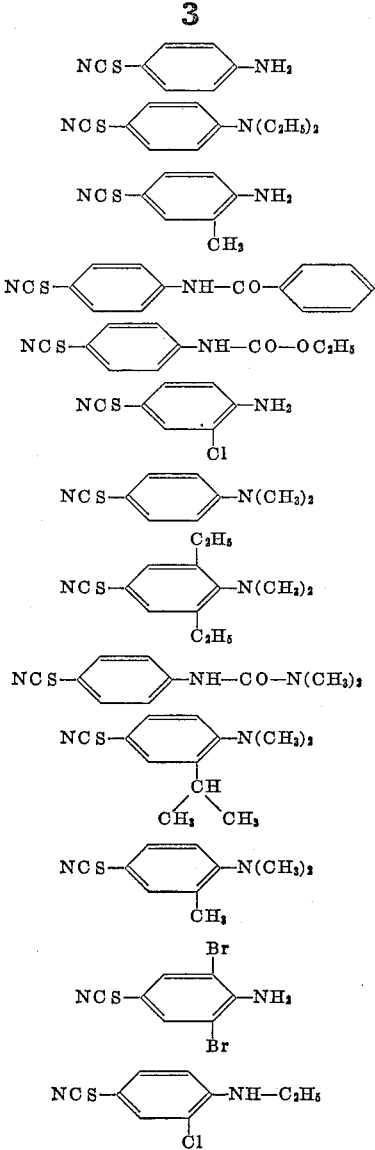

The compounds to be employed according to the invention have in part been described in the literature or if they are unknown they can also be prepared quite generally according to methods known per se. Such methods have inter alia, been described in Houben Weyl, vol. 9, p. 859–865.

The mechanism via the thiocyanate introduction into aromatic amines according to the methods of P. Kaufmann (cf. summary in Ang. Chem. 54, 195 (1941)) has proved to be of particular advantage for the preparation. During this operation, it is possible either to introduce thiocyanate into an appropriately substituted aromatic amine or to introduce further substituents into an amine which has already been substituted by thiocyanate. The latter method is particularly suitable for the production of N-acylated thiocyano-amines and may be demonstrated by the example of N-ethyl-N(2-chloro-4-thiocyanophenyl)-N′, N′-dimethyl-urea:

N-ethyl-2-chloraniline is substituted with thiocyanate by a method known per se according to Kaufmann. The N-ethyl-4-thiocyano-2-chloroaniline thus obtainable with good yields is then converted to the tetrasubstituted urea either by reaction with dimethylcarbamic acid chloride in the presence of acid-binding agents or by reaction with chlorocarbonic acid ester and subsequent amidation with dimethylamine.

Among the multiplicity of processes for the preparation, mention should also be made of the exchange of amino groups for thiocyano groups via the corresponding diazonium salts according to the Sandmeyer method. By this procedure, it is possible to prepare those thiocyano compounds which are accessible only with difficulty by direct substitution, e.g. m-thiocyano-anilines.

The following examples show in greater detail the activity of the compounds to be employed according to the invention:

Example 1

The above-mentioned compounds can be employed as herbicides. In the widest sense, the term weeds is applied to plants which grow in places where they are not wanted. They can in addition be employed as desiccants and defoliating agents. Their application is effected with the use of inert carrier material by the spraying sprinkling, or dusting technique. The compounds are also characterised in that they exert a strong phytotoxic activity when sprayed or sprinkled even at low concentrations. Their phytotoxicity varies depending upon the type of the substituents on the ring, so that the compounds can be employed as agents with a selective activity and also as total herbicides.

For the following application, the spray solutions were prepared by dissolving the active agents in acetone and emulsifying them in water with the addition of an emulsifying agent. Their application is effected with commercial spraying or sprinkling apparatus.

At the time of treatment, the plants had a height of 5–15 cm., depending on the plant variety. The cereal varieties had 2–3 leaves. The damage to the plant was evaluated 3 weeks after the treatment. In the following experiments to determine an active amount, the specified indices signify:

0 = no effect,
1 = slight scorch marks,
2 = distinct marginal scorching,
3 = severe damage, individual leaves destroyed,
4 = plant partially destroyed,
5 = plant completely killed.

After spraying the different plant varieties with a 0.1% solution of the following compound:

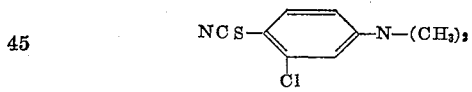

the following degrees of damage resulted:

| | |
|---|---|
| Chenopodium album | 5 |
| Avena sativa | 4 |
| Gossypium herbaceum | 5 |
| Triticum aestivum | 3 |
| Sinapis arvensis | 5 |
| Solanum lycopersicum | 5 |
| Phaseolus vulgaris | 5 |
| Stellaria media | 5 |
| Oryza sativa | 4–5 |
| Portulaca oleracea | 5 |
| Eleusine indica | 5 |
| Matricaria chemomilla | 4–5 |

The compound is also suitable for selective weed control in cereals, when the concentration is reduced to 0.01%. After treatment with a 0.01% solution, the following results were obtained:

| | |
|---|---|
| Panicum spec. | 5 |
| Chenopodium album | 4–5 |
| Avena sativa | 0 |
| Triticum aestivum | 1 |
| Gossypium herbaceum | 5 |
| Sinapis arvensis | 5 |
| Stellaria media | 4–5 |
| Portulaca oleracea | 5 |
| Oryza sativa | 0 |

The following compounds act in a similar manner, as is revealed by the following tables:

| Compound | Concentration applied, percent | Millet | Beet | Oats | Cotton | Wheat | Mustard | Tomato | Bean | Chickweed | Rice |
|---|---|---|---|---|---|---|---|---|---|---|---|
| NCS—⟨Cl, NH₂⟩ | 0.2 | 5 | 5 | 3 | 5 | 4 | 5 | 5 | 3 | 3 | 5 |
| | 0.1 | 5 | 5 | 3 | 5 | 3 | 5 | 4-5 | 3 | 2-3 | 3 |
| | 0.05 | 5 | 5 | 3 | 5 | 3 | 5 | 2 | 2 | 2 | 3 |
| | 0.025 | 5 | 4-5 | 2 | 3 | 3 | 5 | 2 | 2 | 1-2 | 3 |
| | 0.0125 | 5 | 4 | 0 | 1 | 1 | 5 | 2 | 2 | 0 | 2 |
| NCS—⟨NH—C₂H₅, Cl⟩ | 0.4 | 5 | 5 | 4-5 | 5 | 4-5 | 5 | 5 | 5 | 4-5 | 5 |
| | 0.2 | 5 | 5 | 4-5 | 5 | 4-5 | 5 | 5 | 5 | 4-5 | 5 |
| | 0.1 | 5 | 5 | 4 | 5 | 4 | 5 | 5 | 5 | 4-5 | 5 |
| | 0.05 | 5 | 5 | 4 | 4 | 3-4 | 5 | 5 | 4 | 4 | 4 |
| | 0.01 | 3 | 5 | 2 | 2 | 3 | 4 | 4 | 2 | 2-3 | 2 |
| NCS—⟨Cl, NH₂, Cl⟩ | 0.2 | 5 | 5 | 2 | 5 | 3 | 5 | 5 | 3-4 | 2 | 3 |
| | 0.1 | 5 | 4 | 2 | 3 | 2 | 5 | 1 | 2 | 0 | 2 |
| | 0.05 | 5 | 3 | 0 | 3 | 1 | 5 | 0 | 2 | 0 | 1 |
| | 0.025 | 5 | 3 | 0 | 2 | 0 | 5 | 0 | 1 | 0 | 1 |
| | 0.0125 | 4-5 | 1 | 0 | 0 | 0 | 5 | 0 | 1 | 0 | 0 |
| NCS—⟨Cl, NH₂, Cl⟩ | 0.2 | 5 | 4 | 3 | 4 | 2 | 5 | 1 | 4 | 1 | 2 |
| | 0.1 | 4 | 4 | 1 | 2 | 1 | 5 | 0 | 3 | 1 | 1 |
| | 0.05 | 4 | 4 | 0 | 2 | 1 | 5 | 0 | 2 | 0 | 1 |
| | 0.025 | 4 | 0 | 0 | 0 | 0 | 5 | 0 | 0 | 0 | 0 |
| | 0.0125 | 4 | 0 | 0 | 0 | 0 | 4 | 0 | 0 | 0 | 0 |
| NCS—⟨NH₂, CH₃⟩ | 0.4 | 5 | 5 | 4-5 | 4-5 | 4-5 | 5 | 5 | 4 | — | — |
| | 0.2 | 5 | 5 | 4 | 4-5 | 4 | 5 | 4 | 3 | — | — |
| | 0.1 | 5 | 5 | 3-4 | 3 | 3 | 5 | 4 | 2 | — | — |
| | 0.05 | 5 | 5 | 3 | 3 | 3 | 4-5 | 2 | 1 | — | — |
| | 0.01 | 5 | 3 | 1 | 1 | 1 | 2 | 1 | 0 | — | — |
| NCS—⟨N(C₂H₅)₂, OCH₃⟩ | 0.4 | 5 | 5 | 4-5 | 4-5 | 4 | 5 | 5 | 4 | — | — |
| | 0.2 | 5 | 5 | 4 | 4 | 3 | 5 | 4 | 3 | — | — |
| | 0.1 | 5 | 5 | 3 | 2 | 3 | 5 | 4 | 3 | — | — |
| | 0.05 | 4 | 4 | 3 | 2 | 2 | 5 | 3 | 2 | — | — |
| | 0.01 | 4 | 3 | 1 | 0 | 0 | 5 | 0 | 2 | — | — |

| Compound | Concentration applied, percent | Millet | Beet | Oats | Cotton | Wheat | Mustard | Tomato | Bean |
|---|---|---|---|---|---|---|---|---|---|
| NCS—⟨Cl, NH₂, OCH₃⟩ | 0.4 | 5 | 4-5 | 4 | 3 | 4 | 5 | 4 | 3 |
| | 0.2 | 5 | 4 | 3 | 2 | 3 | 5 | 3 | 2 |
| | 0.1 | 5 | 3 | 2 | 1 | 2 | 4 | 2 | 2 |
| | 0.05 | 5 | 3 | 2 | 1 | 1-2 | 4 | 1 | 1 |
| | 0.01 | 4 | 3 | 1 | 0 | 0 | 2 | 0 | 1 |
| NCS—⟨N(C₂H₅)(CO—CH₃), Cl⟩ | 0.4 | 5 | 5 | 4-5 | 4-5 | 4 | 5 | 5 | 5 |
| | 0.2 | 5 | 5 | 4-5 | 4-5 | 3 | 5 | 5 | 4 |
| | 0.1 | 5 | 5 | 4 | 4-5 | 3 | 5 | 5 | 3-4 |
| | 0.05 | 5 | 5 | 5 | 3 | 2 | 5 | 5 | 3 |
| | 0.01 | 5 | 5 | 0 | 0 | 0 | 4 | 1 | 1 |
| NCS—⟨N(C₂H₅)(CO—CH₂Cl), Cl⟩ | 0.4 | 5 | 5 | 5 | 5 | 4 | 5 | 5 | 5 |
| | 0.2 | 5 | 5 | 4-5 | 5 | 4 | 5 | 5 | 4-5 |
| | 0.1 | 5 | 5 | 5 | 5 | 4 | 5 | 5 | 4-5 |
| | 0.05 | 5 | 4 | 4-5 | 4-5 | 3 | 5 | 4 | 4 |
| | 0.01 | 5 | 4 | 3 | 2 | 2 | 5 | 3 | 2 |
| NCS—⟨N(C₂H₅)(CO—N(CH₃)₂), Cl⟩ | 0.4 | 5 | 5 | 5 | 5 | 4-5 | 5 | 5 | 5 |
| | 0.2 | 5 | 5 | 4-5 | 5 | 4 | 5 | 5 | 5 |
| | 0.1 | 5 | 5 | 4 | 5 | 4 | 5 | 5 | 4-5 |
| | 0.05 | 5 | 5 | 3-4 | 3 | 3 | 5 | 5 | 4 |
| | 0.01 | 5 | 5 | 2 | 2 | 1 | 5 | 2 | 3-4 |
| NCS—⟨NH—CO—NH—CH₃, Cl⟩ | 0.4 | 5 | 5 | 3-4 | 5 | 3 | 5 | 5 | 4-5 |
| | 0.2 | 5 | 5 | 2 | 3 | 2 | 5 | 5 | 4 |
| | 0.1 | 5 | 5 | 0 | 2 | 0 | 4 | 3 | 3-4 |
| | 0.05 | 4 | 3 | 0 | 0 | 1-2 | 2 | 1 | 2 |
| | 0.01 | 3 | 2 | 0 | 0 | 0 | 0 | 0 | 2 |
| (CH₃)₂—N—⟨CH₃⟩—SCN | 0.2 | 5 | 4-5 | 4 | 5 | 3-4 | 5 | 5 | 5 |
| | 0.1 | 5 | 4-5 | 2 | 4-5 | 3 | 4-5 | 5 | 5 |
| | 0.05 | 4-5 | 4-5 | 0 | 4-5 | 3 | 4 | 5 | 4-5 |

| Compound | Concentration applied, percent | Millet | Beet | Oats | Cotton | Wheat | Mustard | Tomato | Bean | Chickweed | Rice |
|---|---|---|---|---|---|---|---|---|---|---|---|
| NCS—⟨N(C₂H₅)₂⟩ | 0.2 | 5 | 5 | 5 | 5 | 5 | 5 | 5 | 5 | 4-5 | 5 |
| | 0.1 | 5 | 5 | 5 | 5 | 5 | 5 | 5 | 4-5 | 4-5 | 5 |
| | 0.05 | 5 | 5 | 3 | 5 | 5 | 3 | 5 | 3 | 3 | 4-5 |
| | 0.025 | 5 | 4 | 3 | 3-4 | 5 | 3 | 5 | 2-3 | 3 | 2 |
| | 0.0125 | 5 | 4 | 2 | 2 | 5 | 1 | 1 | 1 | 2-3 | 1 |

| Compound | Concentration applied, percent | Millet | Beet | Oats | Cotton | Wheat | Mustard | Tomato | Bean |
|---|---|---|---|---|---|---|---|---|---|
| 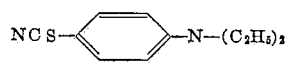 | 0.2 | 5 | 5 | 3 | 5 | 2 | 5 | 5 | 5 |
| 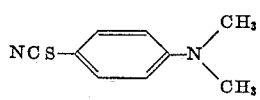 | 0.2 | 3 | 2 | 3 | 3 | 3 | 4–5 | 2 | 1 |
| 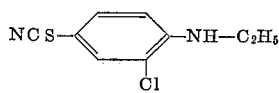 | 0.2 | 4–5 | 4–5 | 3 | 4–5 | 2 | 4–5 | 4–5 | 5 |
| 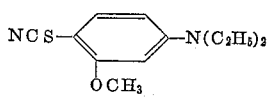 | 0.2 | 3 | 2–3 | 2 | 2 | 1–2 | 4–5 | 2 | 1 |
| 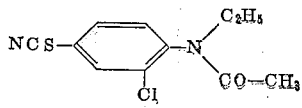 | 0.2 | 5 | 4–5 | 3 | 5 | 3 | 5 | 5 | 5 |

*Example 2*

The compound

NCS—⟨C₆H₄⟩—N—(C₂H₅)₂ also acts like the compounds already mentioned above and moreover it is principally suitable for defoliating cotton.

When ripe cotton plants (50% of the capsules open) had been sprayed in the open with 0.2 or 0.1% solutions, 80–90% of defoliation could be observed 7 days later.

In this test, the analogous dimethyl compound

NCS—⟨C₆H₄⟩—N(CH₃)₂ was also evaluated, when the same effect was observed.

We claim:

1. Method for controlling plant growth which comprises applying to a plant an active amount of a compound of the formula NCS—⟨C₆H₃(Cl)⟩—NH—C₂H₅

2. Method for controlling plant growth which comprises applying to a plant an active amount of a compound of the formula

NCS—⟨C₆H₃(OCH₃)⟩—N(C₂H₅)₂

3. Method for controlling plant growth which comprises applying to a plant an active amount of a compound of the formula

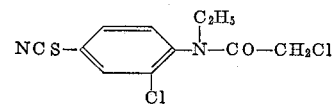

4. Method for controlling plant growth which comprises applying to a plant an active amount of a compound of the formula

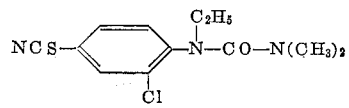

5. Method for controlling plant growth which comprises applying to a plant an active amount of a compound of the formula

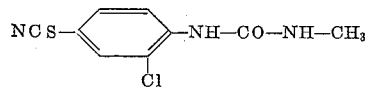

6. Method for controlling plant growth which comprises applying to a plant an active amount of a compound of the formula

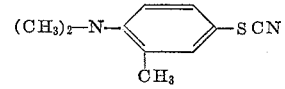

7. Method for controlling plant growth which comprises applying to a plant an active amount of a compound of the formula

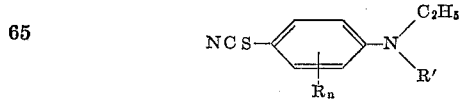

8. A method for controlling plant growth which comprises contacting the plant with an active amount of a compound of the formula

NCS—⟨C₆H₄₋ₙRₙ⟩—N(C₂H₅)(R′)

wherein R′ is a member selected from the group consisting of a hydrogen, lower alkyl carbonyl, chlorolower alkyl carbonyl, carbamoyl, phenyl carbonyl, carbo lower alkoxy, hydroxy lower alkyl and lower alkyl; R is a member selected from the group consisting of chloro, lower alkyl and lower alkoxy; and $n$ is an integer of 1–2.

9. Method for controlling plant growth which comprises applying to a plant an active amount of a compound having the formula

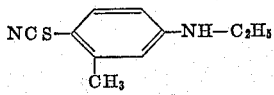

References Cited by the Examiner
UNITED STATES PATENTS

| | | | |
|---|---|---|---|
| 2,024,098 | 12/1935 | Heckert | 167—30 |
| 2,203,919 | 6/1940 | Murphy | 167—22 |
| 3,215,519 | 11/1965 | Desmoras et al. | 71—2.3 |

FOREIGN PATENTS 1,294,804  6/1962  France.

OTHER REFERENCES

Hartzell et al.: Contribution Boyce-Thompson Institute, vol. 6, 1934, pp. 269 to 277, p. 271 particularly relied upon.

LEWIS GOTTS, *Primary Examiner.*

JULIAN S. LEVITT, *Examiner.*

J. O. THOMAS, *Assistant Examiner.*